(12) United States Patent
Chen et al.

(10) Patent No.: US 12,506,914 B2
(45) Date of Patent: Dec. 23, 2025

(54) METHODS AND SYSTEMS FOR MANAGING A MEDIA VIEWING SESSION

(71) Applicant: Adeia Guides Inc., San Jose, CA (US)

(72) Inventors: Tao Chen, Palo Alto, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 69 days.

(21) Appl. No.: 18/544,010

(22) Filed: Dec. 18, 2023

(65) Prior Publication Data
US 2025/0203139 A1   Jun. 19, 2025

(51) Int. Cl.
*H04N 21/2543* (2011.01)
*H04N 21/214* (2011.01)
*H04N 21/258* (2011.01)
*H04N 21/2668* (2011.01)

(52) U.S. Cl.
CPC .. *H04N 21/25435* (2013.01); *H04N 21/25841* (2013.01); *H04N 21/25875* (2013.01); *H04N 21/2668* (2013.01); *H04N 21/2143* (2013.01)

(58) Field of Classification Search
CPC ....... H04N 21/25435; H04N 21/25841; H04N 21/25875; H04N 21/2668; H04N 21/2143
See application file for complete search history.

(56) References Cited

U.S. PATENT DOCUMENTS

| | | |
|---|---|---|
| 2012/0266200 A1 | 10/2012 | Dasher et al. |
| 2013/0152174 A1* | 6/2013 | Raley ............... H04L 63/10 726/4 |

FOREIGN PATENT DOCUMENTS

EP   2561462 B1   11/2019

OTHER PUBLICATIONS

Hulu Help Center, "Plans and Prices", (Jan. 11, 2024), (https://help.hulu.com/s/article/how-much-does-hulu-cost#:~: text=Hulu%3A%20Our%20ad%2Dsupported%20plan,Additional%20terms%20apply.),(2 pages).
Netflix Help Center, "How to set or update a Netflix Household", (https://help.netflix.com/en/node/128339#:~:text=How%20Netflix%20detects%20devices%20within,physical%20location%20of%20your%20devices.),(2 pages).
Netflix Help Center, "Netflix Ad-supported Plans",(https://help.netflix.com/en/node/126831), (1 page).
The Walt Disney Company, "Ad-Supported Disney+ Plan Now Available In The US With More Than 100 Advertisers Across All Major Categories At Launch " (Dec. 8, 2022), (3 pages).

* cited by examiner

*Primary Examiner* — Sumaiya A Chowdhury
(74) *Attorney, Agent, or Firm* — HALEY GUILIANO LLP

(57) ABSTRACT

The present disclosure describes methods and systems for managing a media viewing session, e.g., by associating a media content access level of a first user account with a subscription tier of a second user account. This process includes detecting a login event over a network associated with the second user account and adjusting the first account's access to media content based on the second account's subscription capabilities.

18 Claims, 11 Drawing Sheets

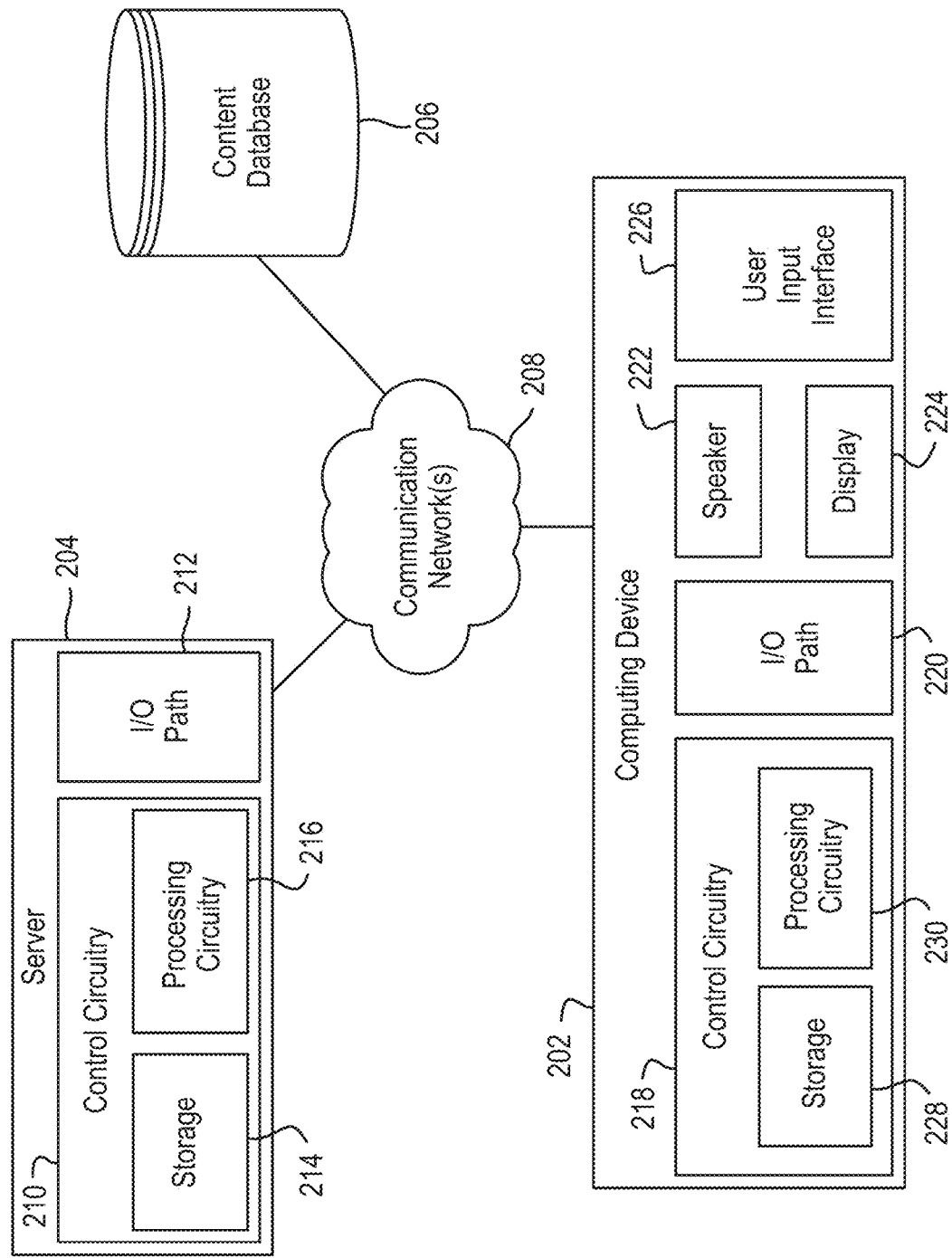

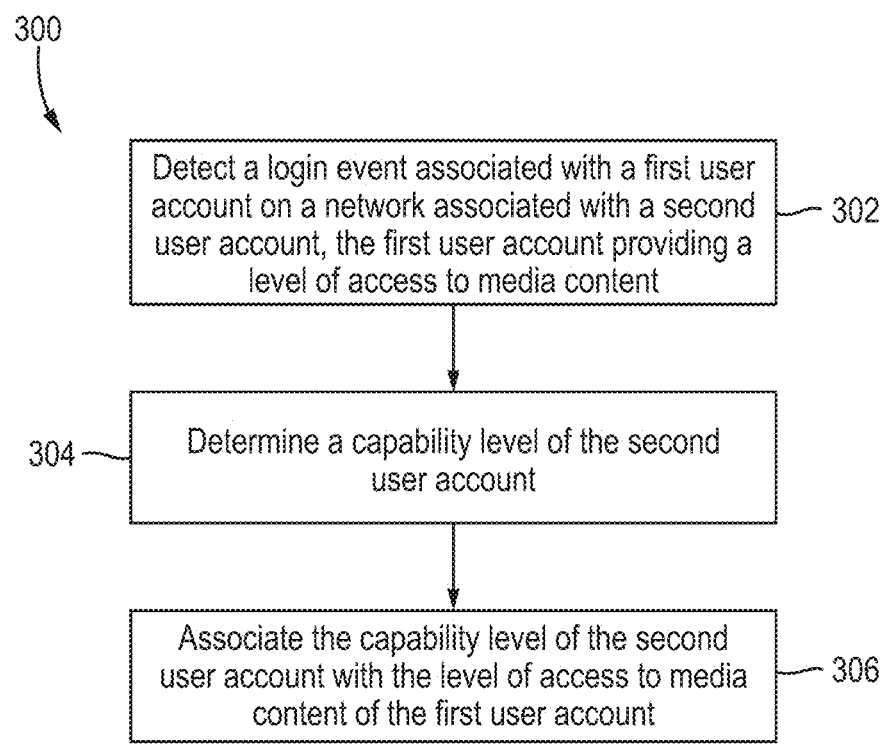

METHODS AND SYSTEMS FOR MANAGING A MEDIA VIEWING SESSION

BACKGROUND

The present disclosure relates to methods and systems for managing a media viewing session, e.g., by associating capabilities of user accounts. Particularly, but not exclusively, the present disclosure relates to methods and systems for associating a level of media content access of a first user account with a subscription tier of a second user account.

SUMMARY

Digital content distribution platforms operating on a tiered subscription model have become common place in the modern entertainment landscape. Users, based on their subscription tier, are accorded specific levels of service, each with distinct capabilities such as streaming resolution, number of simultaneous streams, and ad-free content access. At the same time, establishments, such as hotels, endeavor to enhance guest experiences by offering high-quality entertainment options, often facilitated through television sets and other connected devices on the premises. While these establishments may possess infrastructure capable of delivering high-quality digital content, guests accessing digital content through their personal accounts on these platforms are confined to the service levels of their respective subscriptions, which may not fully leverage the available infrastructure for an optimized viewing experience.

The present state of digital content distribution often operates within a framework where users are bound by the capabilities defined by their subscription tier. While this model serves the purpose in a static environment, it exhibits inherent limitations when interfaced with dynamic environments, like hospitality establishments. For instance, a hotel (or other network operator) might have infrastructure capable of delivering ultra-high-definition (UHD) or higher resolution content, but users accessing content through their personal accounts may be limited to lower resolution streaming due to their subscription tier.

Moreover, a traditional content distribution model does not account for transient changes or enhancements in service capabilities that could be availed when accessing a network associated with another user account, e.g., when in proximity to or within the premises of establishments that have higher capability infrastructure. This results in a suboptimal utilization of the available technological infrastructure and a less than optimal user experience. The rigidness of the traditional model does not allow for a flexible, contextual enhancement of user capabilities even when the surrounding infrastructure permits.

Additionally, the traditional model does not provide a mechanism for establishments, like hotels, or network operators to offer enhanced digital content service levels to their patrons as a part of their service offering, without navigating through cumbersome processes. This is a missed opportunity for such establishments to elevate the user experience by leveraging their existing infrastructure.

Furthermore, the static nature of the current digital content distribution model does not foster a collaborative interaction between content distribution platforms and establishments or network operators. The absence of a dynamic, adaptable framework hinders the evolution of a more user-centric, experience-enhanced digital content distribution ecosystem.

Hence, there is a need for an approach that addresses the aforementioned challenges, fostering a more flexible, context-aware digital content access and consumption model, which harmonizes the user subscription model with the dynamic environment in which they access the content.

Systems and methods are provided herein for detecting a login event associated with a first user account on a network associated with a second user account, the first user account providing a level of access to media content, e.g., a level of access that defines access to a predetermined content library. A capability level of the second user account is determined, the capability level defining how media content is delivered over the network, e.g., at a predefined resolution. The capability level of the second user account is associated with the level of access to media content of the first user account in response to the login event. The first user account may then benefit from capabilities which may not be otherwise available through the first user account via a network associated with the second user account. This results in optimal utilization of the technological infrastructure offered over the network associated with a second user account.

In some examples, a predetermined condition for disassociation between user accounts may comprise any one or more of: disconnection of a user device associated with a first user account from the network; expiration of a predefined period; and receipt of a logout instruction from the first user account. In some examples, satisfaction of the predetermined condition triggers reverting the access to the capability level of the second user account.

In some examples, a capability, e.g., a specification or an operational parameter, of a device associated with the first user account is determined to utilize the capability level associated with the second user account. In some examples, the level of access to media content of the first user account may be adjusted based on the device capabilities, ensuring an optimized user experience based on device capabilities.

In some examples, a network connection between a device associated with the first user account and a network associated with the second user account may be identified. The device may be added to a user profile containing devices associated with the second user account, aiding in tracking, and managing devices associated with the second user account.

In some examples, the user profile may be updated to reflect a change in the capability level during the association of the capability level of the second user account to the first user account, keeping the user profile updated with the latest capability level information.

In some examples, the level of access to media content may comprise any one or more of: increased streaming resolution; additional simultaneous streaming capabilities; ad-free streaming; access to premium or exclusive content; free rentals, enhanced playback controls; offline viewing or downloading capabilities; expanded content library; early access to newly released media content; enhanced audio quality; access to additional audio or subtitle languages; customized content recommendations; reduced advertisement frequency; fast-forward or rewind capabilities; and access to interactive features or additional media content metadata, offering a wide range of enhanced features and controls for an enriched user experience.

In some examples, the second user account may be associated with a service provider and the network may be associated with a physical location of the service provider, e.g., enabling enhanced services to be offered by the service provider.

In some examples, the capability level of a device associated with the first user account maybe disassociated from the level of access to media content of the first user account when the device leaves a proximity of the physical location associated with the service provider, e.g., ensuring the enhanced services are location-bound.

In some examples, user information associated with the first user account may be retrieved. In some examples, a activity status associated with the user information may be identified, e.g., in relation to the activity between the first user account and the service provider associated with the second user account. In some examples, the associated capability level may be adjusted based on the activity status, allowing for enhancements to the capability level based on the activity status.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 is a block diagram showing components of an example system for associating one or more operational privileges of one user account with another user account, in accordance with some examples of the disclosure;

FIG. 3 illustrates a flowchart representing an exemplary process for associating the capability level of a second user account with the level of access to media content of a first user account, in accordance with some examples of the disclosure;

DETAILED DESCRIPTION

A modern digital landscape includes various modes of media content delivery, such as subscription video on demand (SVOD), video on demand (VOD), advertising-supported video on demand (AVOD), and over the top (OTT) services, facilitating diverse ways for users to access and consume media content such as movies, episodes of TV shows, documentaries, etc. SVOD services offer tiered subscriptions, where higher tiers provide enhanced access or service quality. VOD, on the other hand, allows users to pay per view, while AVOD services monetize through advertisements. OTT services encapsulate these models, delivering content over the internet, or any other appropriate network.

In the context of this disclosure, when a first user logs into a content delivery platform via a network associated with a second user account, the capability level of the second user account may be associated with the service level of the first user account. This association may enhance the first user's media consumption experience based on the capability level of the second user account. For instance, if the capability level of the second user account is associated with a higher subscription tier on an SVOD platform, the first user account may inherit, e.g., temporarily inherit, the enhanced streaming quality and/or additional features afforded by that higher tier. Moreover, the systems and methods disclosed herein may offer a transition in service models, for instance, temporarily transitioning a user from an AVOD model to an SVOD model, e.g., effectively removing advertisements during the streaming session.

Figure 1:
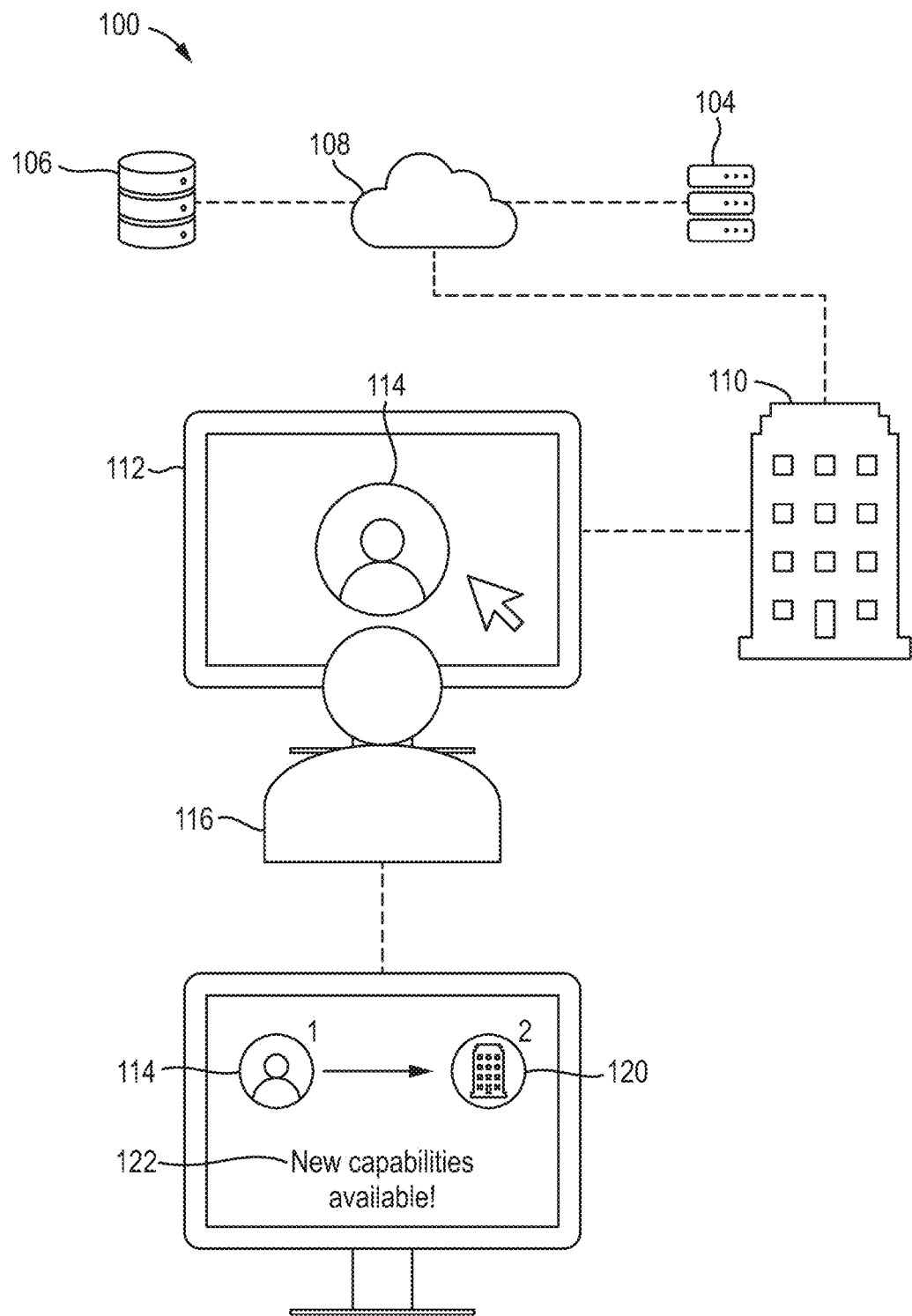
FIG. 1 illustrates an overview of a system for associating one or more operational privileges of one user account with another user account, in accordance with some examples of the disclosure.

FIG. 1 illustrates an exemplary system 100 configured to associate one or more operational privileges (e.g., capabilities) of one user account with another user account. For example, a first user account may have access to media content, e.g., by virtue of a subscription level or tier, at a first capability level. In the context of the present disclosure, a "capability level" is understood to be a level of operational privileges or permissions relating to how media content may be accessed by a user account. For example, a capability may relate to various factors, such as a quality (e.g., SD, HD, UHD) in which a user account can access media content, a number of profiles permitted to be associated with a user account, a permission to download media content, and/or a geographical permission for accessing media content.

In the example shown in FIG. 1, system 100 is configured to associate a capability level of a second user account with a first user account in response to a login event, e.g., at a user device. However, in other examples, association of capabilities between user accounts may be in response to any appropriate action, such as detection of a user device on a network, proximity to an establishment, a geographical location of a user device, etc. The depicted scenario in FIG. 1 is arranged within a framework of a server 104, a database 106 and a communication network 108, which communicatively connects server 104 and database 106 for the distribution of content, e.g., to a user device 112 associated with an account of a first user 116 (e.g., a first user account). In the example shown in FIG. 1, a second user, e.g., hotel establishment 110, is associated with a second user account and is connected to the communication network 108. The second user account may operate several devices, e.g., on a second (local area) network, thereby establishing a network domain associated with the second user account. For example, the hotel establishment 110 may have several television sets, one for each room, all connected to the hotel's network. These television sets may each have individual identifiers but are collectively managed or controlled via the second user account, which is associated with the hotel establishment. In other examples, discussed later, the second user account may operate several devices distributed over a larger network, e.g., a wide area network not confined to a geographical location.

When a first user 116 logs into a personal account which provides a level of access to media content on a user device 112, from a network associated with the second user account, for instance, one of the television sets in a room, the system recognizes a network domain under which the login event occurs.

In some examples, the user device 112 may be a personal device of the first user 116 such as a laptop or mobile phone. Upon connecting to a local area network, for instance, the Wi-Fi network of the hotel, the system may recognize the personal device of the first user. This recognition may be facilitated through network credentials or device identifiers associated with the personal device such as a MAC address or IP address.

The first user account embodies any account that facilitates access to media content, exemplified by access to content distribution platforms. Such platforms could range from video streaming services, music streaming platforms, to other digital media distribution outlets. When a first user logs into such platforms via their account, they gain access to a specified range of media content as defined by their subscription level or membership tier. The breadth of media content and the quality of service accessible to them are delineated by the terms of their individual account with the content distribution platform. Given that the network domain is associated with the second user account belonging to the hotel, the system identifies this as a triggering event for assessing the capability level of the second user account. This capability level essentially defines the parameters, e.g., quality, of media content delivery over the network domain managed by the second user account.

A network domain associated with the second user account may encompass various means for connecting to the network. For instance, the hotel establishment, acting as the second user, may have a multifaceted network infrastructure comprising a Wi-Fi network, Ethernet connection ports, and devices that are already logged-in or connected to a predefined network, such as television sets or other streaming devices. The network domain associated with the second user account may extend across multiple buildings and locations. For instance, a hospitality service provider like a hotel chain may have a unified network domain that spans across different geographical locales, each with its own infrastructure yet centrally managed under the second user account.

The second user account may be held by an individual user or an entity or service provider, such as a hotel. Unlike a standard user account which provides direct access to media content, the second user account provides access to an enhanced or at least different level of service or capabilities available to the first user's account. These capabilities are often characteristic of higher-tier subscriptions on the content distribution platform, enabling features such as higher resolution streaming, concurrent streaming on multiple devices, or an ad-free viewing experience. In scenarios like a hotel setup, the second user account serves to unlock or grant these elevated capabilities to the first user's account, enhancing the first user's experience while utilizing the content distribution platform via a device connected to the network associated with the second user account. This enhancement may be triggered when a first user logs into their personal account, aligning with the capability level ascribed to the second user account.

Upon ascertaining the capability level of the second user account 120, the system coordinates an association of this capability level with the level of access to media content of the first user account 114. This association potentially elevates the streaming capabilities of the first user account 114 to a higher tier, mirroring the capabilities of the second user account 120. For instance, if the first user initially possessed basic access to a content streaming platform with standard-definition streaming, this association may promote the streaming quality to a high-definition level, as dictated by the capability level of the second user account.

In the example shown in FIG. 1, a notification 122 is dispatched to the first user 116, informing them of the augmented capability now available on their account. This notification may manifest in various forms, designed to notify the first user of the differences in streaming experience now within their grasp. The migration to the new capability level may occur automatically or may require some interaction from the first user, contingent upon the system's configuration or the preferences delineated by either the second user or the first user.

FIG. 2 is an illustrative block diagram showing an example system 200 configured to facilitate the association of capability levels between user accounts in accordance with the principles disclosed herein. Although FIG. 2 shows system 200 as including a number and configuration of individual components, in some examples, any number of the components of system 200 may be combined and/or integrated as one device, e.g., as a user device 202. System 200 includes computing device 202, server 204 (e.g., server 104 and/or server 108 of FIG. 1), and database 206, each of which is communicatively coupled to communication network 208, which may be the Internet or any other suitable network or group of networks.

In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, display 224, and user input interface 226. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of database 206, and/or the like) may be an electronic storage device. The phrase "electronic storage device" or "storage device" should be understood to mean any device for storing electronic data, computer software, or firmware. Each of storage 214, storage 228, and/or storages of other components of system 200 may be used to store various types of content, metadata, and or other types of data related to the user accounts and their associated capability levels. Cloud-based storage may be used to supplement storages 214, 228 or instead of storages 214, 228. Control circuitry 210 and/or 218 may execute instructions for an application stored in memory (e.g., storage 214 and/or 228) to facilitate the association of capability levels between user accounts as disclosed herein.

The application may be implemented using any suitable architecture. For instance, it may be a stand-alone application wholly implemented on computing device 202, or it may be a client/server application where a client application resides on computing device 202, and a server application resides on server 204. The instructions for carrying out the functionality disclosed herein may be stored on server 204, or alternatively, on computing device 202, or distributed across both. The instructions may be executed by the control circuitry 210, 218 to manage the association of capability levels between user accounts, and to facilitate the enhancement of media content delivery based on the associated capability levels as disclosed herein. The system 200 is configured to detect login events and other trigger events, and to manage the association of capability levels between user accounts in a manner that enhances the user's media content access and delivery experience.

User input interface 226 may be utilized by a user to interact with the system, such as to log in to a user account, to initiate a media content streaming session, or to respond to notifications regarding enhanced capability levels. The user input interface 226 may be any suitable user interface, such as a remote control, keypad, keyboard, touchscreen, touchpad, stylus input, joystick, voice recognition interface, or other user input interfaces. User input interface 226 may be integrated with or combined with display 224, which may be a monitor, a television, a liquid crystal display (LCD), or any other suitable equipment for displaying visual images.

Server 204 and computing device 202 may transmit and receive content and data via I/O path 212 and 220, respectively. For instance, I/O path 212 and/or I/O path 220 may include communication ports configured to transmit and/or receive, via communication network 208, user account data, capability level data, media content data, and other related data to and from database 206 and other components of the system 200. Control circuitry 210, 218 may be used to send and receive commands, requests, and other suitable data using I/O paths 212, 220 to manage the association of capability levels between user accounts and to facilitate the enhanced delivery of media content as disclosed herein.

FIG. 3 illustrates a flowchart representing an exemplary process 300 for associating a capability level of a second user account with a level of access to media content of a first user account, in accordance with some embodiments of the disclosure. While the example shown in FIG. 3 refers to the use of system 200, as shown in FIG. 2, it will be appreciated that the illustrative process shown in FIG. 3, and any of the other following illustrative processes, may be implemented on system 200, either alone or in combination with any other appropriately configured system architecture, such as system 100 shown in FIG. 1.

At step 302, control circuitry, e.g., control circuitry, which may be incorporated within a user device, a content server, a network gateway, or a cloud-based service platform, detects a login event associated with a first user account on a network associated with a second user account, the first user account providing a level of access to media content. This detection may be facilitated through various means such as authentication protocols, network credentials, or device identifiers associated with the first user account and/or user device.

The authentication protocols may include, but are not limited to, OAuth, SAML, or LDAP which may be used to validate the identity of the first user as they attempt to log in to the system. The network credentials may encompass username and password combinations, or even biometric data where applicable. Device identifiers may include media access control (MAC) addresses, IP addresses, or device serial numbers that are unique to the user device through which the first user is accessing the network.

Upon successful detection of the login event, the control circuitry may further ascertain the network domain associated with the first user account. This domain recognition may be based on predefined network configurations, IP address ranges, or specific network hardware associated with the first user account. The system may maintain a database or a registry containing network domain information corresponding to various second user accounts.

At step 304, control circuitry determines a capability level of the second user account. This determination may be based on various factors such as permission levels, or other predefined criteria associated with the second user account, which may be stored in a database or retrieved from a server.

At step 306, control circuitry associates the capability level of the second user account with the level of access to media content of the first user account. This association may enable the first user account to temporarily inherit the capabilities vested in the second user account, thereby altering the media consumption experience for the first user. It is pertinent to note that the association may not always result in an elevated service level but could lead to a different service configuration, such as a transition from an AVOD (advertising-supported video on demand) model to an SVOD (subscription video on demand) model.

This association may be facilitated through a number of mechanisms. Referring to the system configuration illustrated in FIG. 2, upon detection of a login event at the user device 202, the control circuitry 218 within computing device 202 may communicate with the server 204 through the communication network 208. The server 204, having determined the capability level of the second user account, could then instruct the computing device 202 to alter the service level of the first user account accordingly.

In one example of this disclosure, the capability level of the second user account with the level of access to media content of the first user account may be facilitated through the adjustment of a manifest file, which is commonly utilized by content providers for OTT services. A manifest file may point to metadata about the media content and how it should be streamed to the user. It may include information about different available bit rates, resolutions, audio tracks, and whether or not advertisements should be included in the stream. By adjusting or modifying the manifest file to reflect the association of the capability level of the second user account with the first user account, the delivery of content to the first user account can be altered in accordance with the determined capability level.

For instance, if the association leads to a transition from an AVOD to an SVOD model, the manifest file can be adjusted or modified to exclude advertisement segments from the media content stream, thereby effectuating an ad-free viewing experience for the first user. Similarly, if the association enables higher resolution streaming, the manifest file can be adjusted to point to higher-resolution media files or segments. This adjusted manifest file may then be sent to the user device, guiding the streaming client on the user device to fetch and present the media content in the newly associated manner, thus reflecting the change in service configuration for the first user account.

The steps 302, 304, and 306 can be executed in any order or concurrently, as long as a satisfactory result is achieved. The facilitation of these steps may be carried out by the processing circuitry and control circuitry within system 200 as depicted in FIG. 2. The data concerning user accounts, capability levels, and other pertinent information may be stored, accessed, and managed through storages and databases within system 200, aiding in the effective execution of process 300 to enhance the media content delivery experience for users in a networked environment.

Figure 4A:
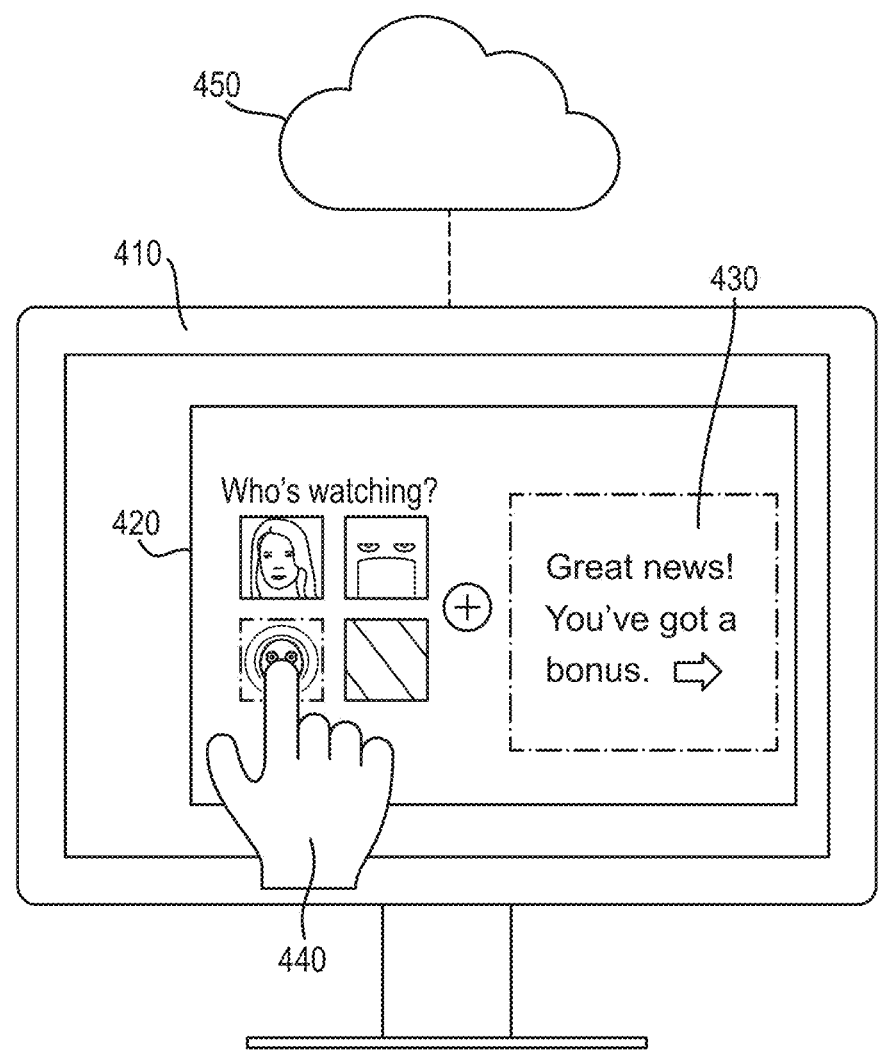
FIG. 4A illustrates a diagrammatic representation of a user device, in accordance with some examples of the disclosure.

FIG. 4A illustrates an exemplary user device 410, depicted here as a television screen, in accordance with embodiments of the present disclosure. As shown, a first user 440 selects a profile 420 associated with their account on a content distribution platform. The first user 440 accesses their account via the user device 410, which is connected to a network associated with a second user, as previously described.

Within a user interface of the content distribution platform, a notification 430 is displayed. The notification 430, in this instance, presents the message "Great news! You've got a bonus," serving to inform the first user 440 of an alteration or augmentation in service level or capabilities, facilitated by the association with the second user's 450 network domain. The presentation of notification 430 may be triggered by the association of the capability level of the second user account with the level of access to media content of the first user account, as delineated in the prior description of process 300.

The notification 430 illustrated in FIG. 4A serves as a communication interface between the system and the first user 440, informing them of an altered state in service level or capabilities. The presentation, content, and triggering of the notification 430 may be implemented in a variety of ways based on the design preferences, the nature of the content distribution platform, and the specifics of the user network environment. The notification may contain text, graphical elements, audio announcements or a combination thereof to convey the intended message to the first user 440 in a clear and engaging manner.

In some embodiments, the notification 430 may display a concise message, such as 'Great news! You've got a bonus,' while in other embodiments, the notification may provide more detailed information regarding the nature and extent of the enhanced capabilities or altered service level. For instance, the notification might specify the new resolution quality available, the temporary upgrade to an ad-free experience, or any other pertinent details regarding the association with the second user account's capability level.

The triggering of the notification 430 may be automated and occur immediately following the association of the capability level of the second user account with the first user account's level of access to media content. This trigger may be facilitated by control circuitry within system 200, which monitors and manages the associations between user accounts and network domains as previously described. Once the association is successfully established, the control circuitry may initiate the display of notification 430 on the user device 410 to inform the first user 440 of the change.

Furthermore, the notification 430 may be customized based on user preferences or account settings. For example, a user may have the option to enable or disable such notifications within their account settings on the content distribution platform. The user's preference in this regard may be stored within a user profile within the content distribution platform and/or a profile associated with the second user account, ensuring that the notification delivery aligns with the user's desired level of engagement and information receipt.

In some implementations, the triggering of notification 430 may also be contingent upon additional factors such as the status of the network connection, the type of content being accessed, or other contextual variables. For instance, the notification might only be triggered if the first user 440 is accessing a type of content that is significantly enhanced by the newly associated capabilities. The notification may be omitted in instances where the capabilities associated with the content being accessed by the first user remain substantially unchanged such as when the second user account offers capabilities that the first user is already subscribed to. Technical mechanisms such as application programming interface (API) calls, webhooks, or other software triggers may be employed to facilitate the timely and accurate triggering and display of the notification 430.

Figure 4B:
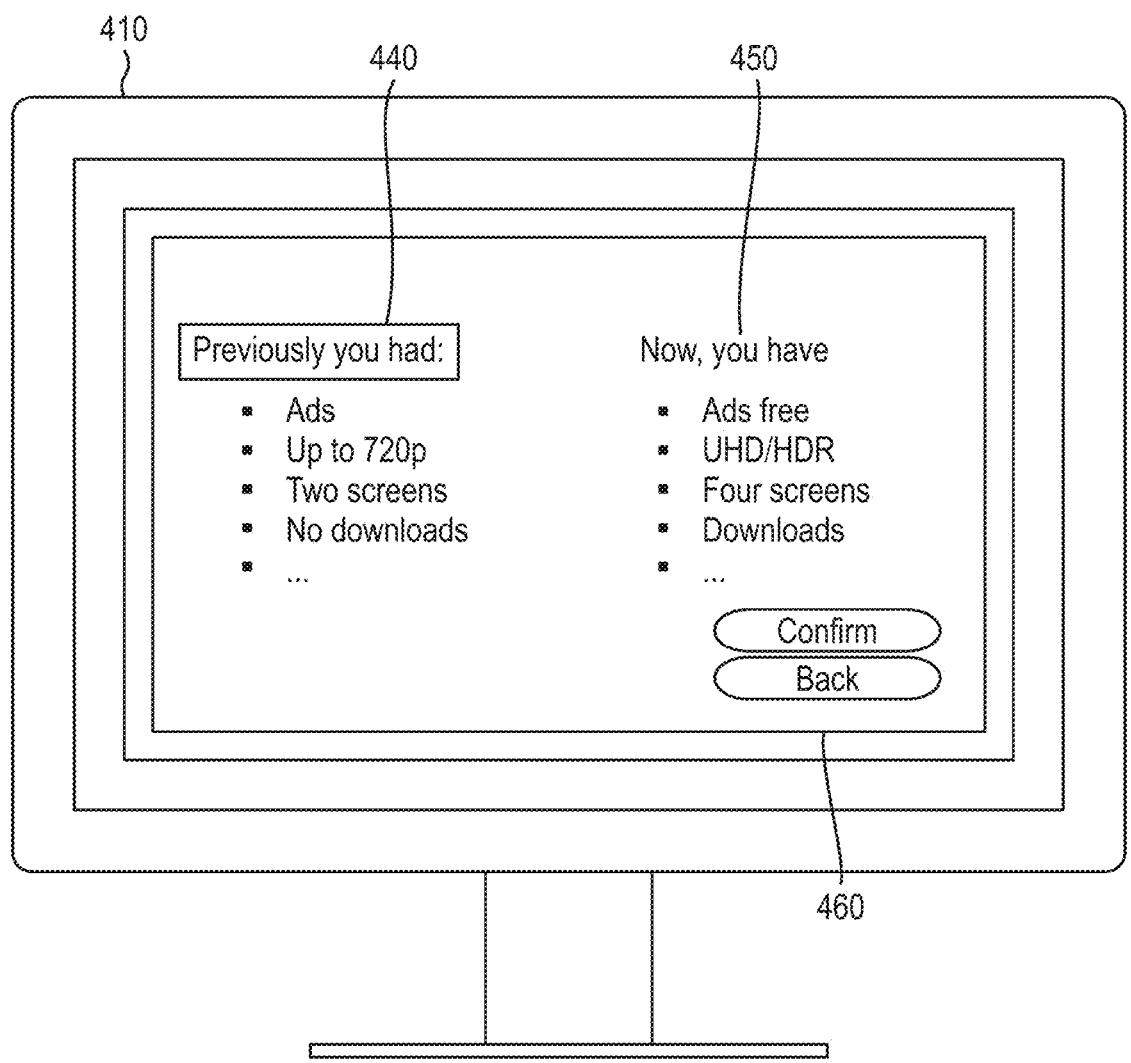
FIG. 4B illustrates a diagrammatic representation of a user interface on a user device, in accordance with some examples of the disclosure.

FIG. 4B provides an illustrative depiction of the user interface on user device 410, exhibiting a transitional stage, e.g., post-identification of the first user account but prior to the application of the enhanced or altered capabilities offered by the second user account. In this interface, a comparative view may be presented to the first user, delineating the current or previous capabilities attributed to the first user account, and the prospective capabilities associated with the second user account.

The section 440 on the user interface may display the existing capabilities of the first user account. It lists features such as the presence of advertisements during media playback, a streaming quality capped at 720p resolution, a limitation of simultaneous streaming on a maximum of two screens, and the unavailability of content download for offline viewing.

Conversely, section 430 outlines the capabilities associated with the second user account that are on offer. This example displays an ad-free viewing experience, an elevated streaming quality of UHD with high dynamic range (HDR) support, the possibility of concurrent streaming on up to four screens, and the availability of content download for offline enjoyment.

To facilitate user autonomy and choice, the user interface may integrate an interactive element 460. This feature may provide the first user with the option to either confirm or deny the transition to the enhanced or altered capabilities offered. The confirmation or denial action may be executed through a simple click or touch interaction, depending on the user device's input modality.

Figure 5:
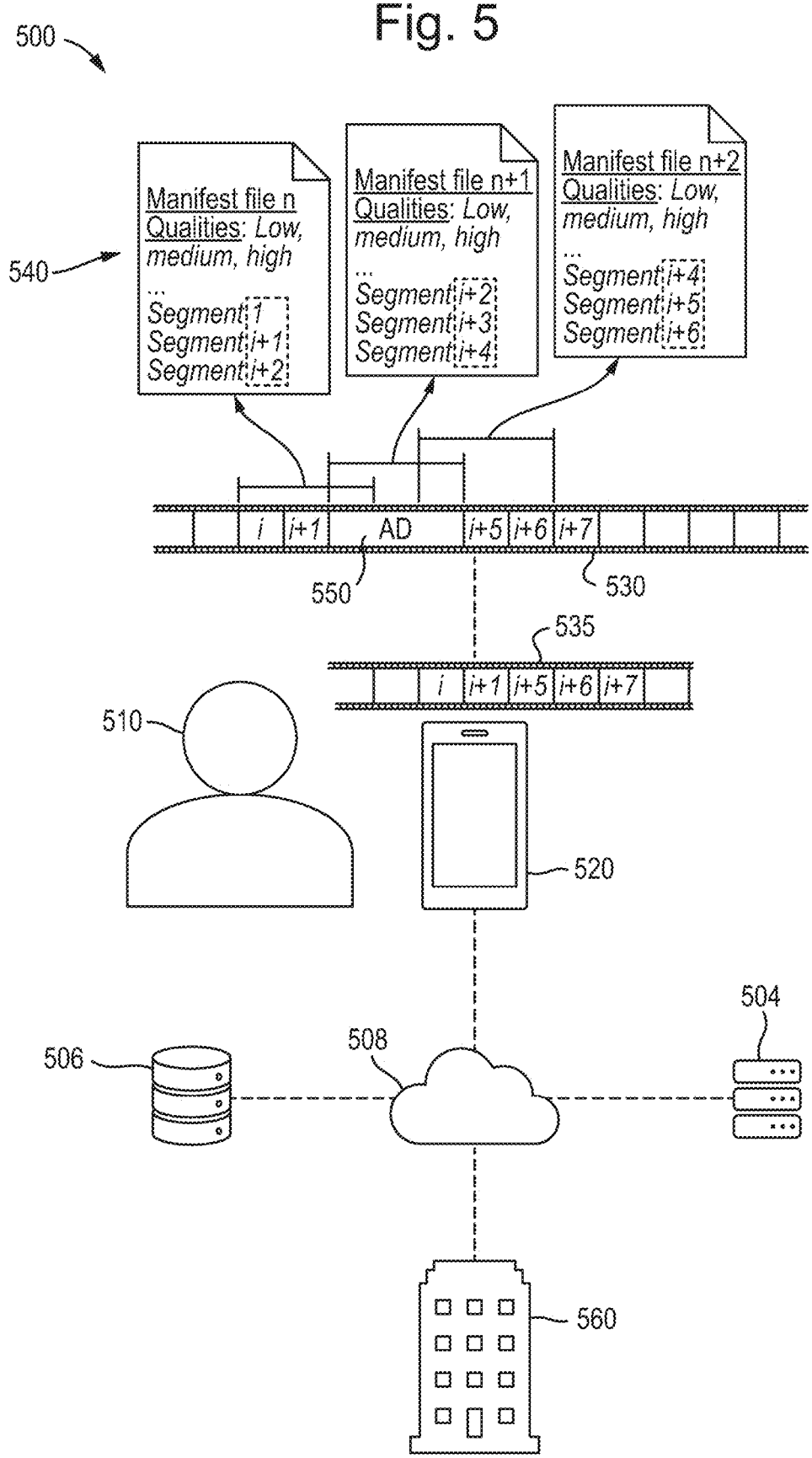
FIG. 5 illustrates an exemplary system for associating the capability level of the second user account with the level of access to media content of the first user account in response to the login event, in accordance with some examples of the disclosure.

FIG. 5 illustrates an exemplary system 500 for associating a capability level of a second user account with a level of access to media content of a first user account in response to a login event. FIG. 5 illustrates the role of manifest files in effecting changes induced by the association of user accounts. FIG. 5 demonstrates how these files, e.g., in coordination with system 500, may be used to modify media content delivery in accordance with the new capability levels attributed to the first user account. The system 500 incorporates an example, server 504, database 506 and network 508. The depicted network 508 is associated with the second user account 560. The first user 510 interacts with their account through user device 520 which is connected to network 508.

In some examples, the association between the second user account and the first user account may be initiated through various means of user identification. For example, the association might be initiated when the first user logs into their account through a local network that holds association with the second user, or when the first user accesses the network of the second user via a browser to log into a particular profile on a platform or website affiliated with the second user account. For example, the association of the second user account to the first user account may be instigated by a log-in event, whereby the first user logs into a profile on, for instance, a website that is associated with the second user account. The network utilized to access this website may be a public network. This log-in event serves as a bridge to associate the first user account with the capabilities inherent in the second user account. In some examples, aligning the media content accessibility and delivery preferences may be achieved by virtue of manifest files. These files may initially reside on server 504 for transmission to user device 520, and may point to metadata pertaining to the media files, such as the location of media segments, their sequence, duration, bit rates, codecs, and other relevant information necessary for the delivery and playback of the content. Additionally, manifest files may be dynamically created in real-time. This may allow user accounts which have access only to on-demand content to also experience live content through association with the second user account.

In the example depicted in FIG. 5, manifest files 540 are portrayed in three variations labelled n, n+1, and n+2 to aid in comprehending their function and evolution. However, the present disclosure is not limited to the variations shown, and any appropriate number and/or variation of manifest file is envisioned to account for the technical implementation of the disclosure. Each of these manifest files 540 is structured to reference segments of video streaming content, represented linearly as 530 with segments denoted by i, i+1 through to i+7. Particularly, the manifest file entry labelled n+1 ascribes segments i+2, i+3, and i+4 to an advertisement 550. This scenario, while illustrative, is not exclusive; in client-side advertisement insertion implementations, advertisements may not be directly referenced in the manifest file. Instead, for example, an ad software development kit integrated within a media player used to stream video content might be responsible for requesting advertisements at predetermined intervals. The scope of the present disclosure encompasses various configurations and methods for integrating advertisements within streaming content.

The association of the first user account with the capabilities of the second user account, as discussed in the context of transitioning from AVOD to an SVOD model, may lead to an ad-free streaming experience. In some examples, this may be facilitated through the server supplying a different manifest file or making one or more alterations in or regenerations of the manifest files, or generation of new manifest files, which control the delivery of content including the rendition of advertisements, and amendments to these files will influence the mode of content delivery to the first user via OTT services.

In illustration 535, a linear content line analogous to 530 is depicted, albeit without segments i+2 to i+4, signifying ad free streaming. This visual representation exemplifies the potential outcome of a different manifest file or altering the manifest files (or generating a new manifest file) to reflect an ad-free viewing experience. Through these manifest files, the system 500 effectively tailors the content delivery to align with the newfound capabilities of the first user account.

The structure of a manifest file may be crafted to accommodate various adaptive streaming technologies such as HTTP live streaming (HLS), dynamic adaptive streaming over HTTP (DASH), or 'smooth streaming'. These technologies allow for the dynamic adjustment of video quality in real-time, based on the viewer's network conditions.

In the context of HLS, for instance, the manifest file, often termed as a playlist file, lists the available media segment files, in a sequence for example, and may have pointers to variant playlists that represent the same content encoded at different bit rates. This allows the client-side player to switch between different bit rates dynamically, depending on the network bandwidth availability.

Manifest files are not only static entities but may be updated dynamically to reflect changes in the streaming session. Such dynamism may be particularly useful in live streaming scenarios where the content is being generated in real-time. The manifest file is updated as new media segments become available, ensuring the client-side player has the latest information to continue the playback without interruptions.

The interaction between manifest files and user account capabilities is a nuanced one. In an environment where different user accounts have varying levels of access to content, manifest files may be tailored to reflect these distinctions. For instance, a manifest file associated with a premium user account on an SVOD platform might be structured to bypass advertisement segments, leading to an ad-free viewing experience. Conversely, a manifest file associated with a standard or free account might include pointers to ad segments, necessitating the viewing of advertisements.

In some examples, the management of manifest files may be automated and triggered by certain events, such as a change in the user's subscription status or the association of a higher capability level from a second user account to a first user account, as described in the preceding discussions. These automated modifications ensure that the user's viewing experience is tailored to reflect their current level of access, without necessitating manual interventions from the system administrators.

Figure 6:
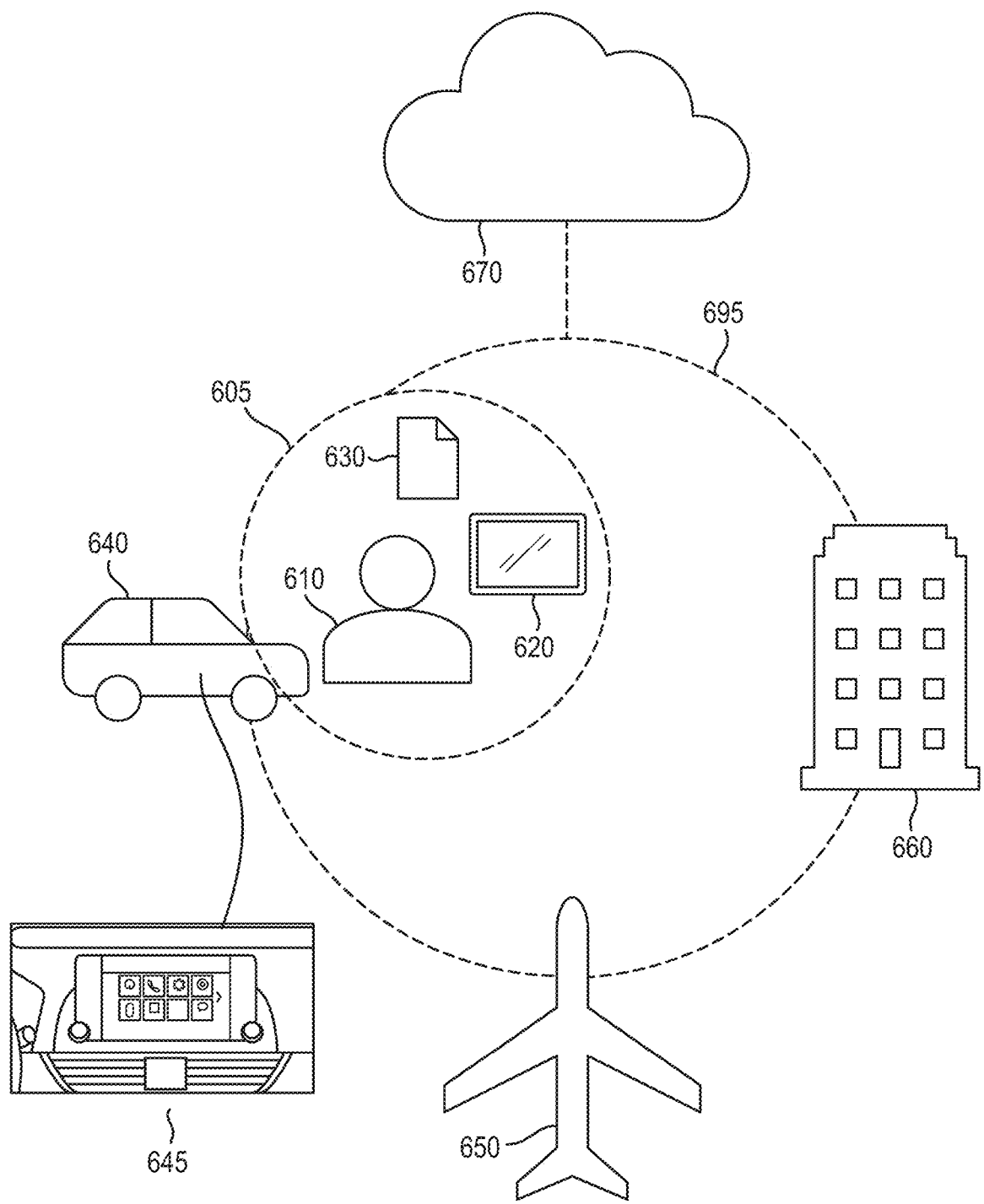
FIG. 6 illustrates exemplary embodiments whereby the first user and the user device may be accommodated through a variety of mediums, in accordance with some examples of the disclosure.

FIG. 6 illustrates a first user 610 and an associated user device 620 that may be moved from one environment to another while retaining access to media content. As illustrated, the user device 620 may be a personal device or any appropriately configured device allowing access to a user account of user 610, including an account associated with the second user.

In the depicted scenario, the first user 610, user device 620, and a manifest file 630 associated with the first user account (e.g., the account from which the first user is accessing media content) are collectively encapsulated within a notional circle 605, symbolizing the unified interaction between these elements. Surrounding this circle is a larger encompassing circle 695 depicting a connection between various environments, such as a vehicle 640 and an associated vehicle interior showing an in-built vehicle display 645, an aircraft 650, and a hospitality establishment 660. Each of the environments depicted within circle 695 is communicatively connected to an exemplary network 670.

The interconnection between the inner circle 605, representing the current environment of the user 610, user device 620, and manifest file 630, and the outer circle 695, representing different environments and the network, symbolizes the dynamic interaction between these elements as the user 610 transitions from one environment to another. As the user 610 crosses the threshold into the vehicle 640, symbolically represented by the first circle 605 crossing into the vehicle's boundary, a trigger event may occur. This trigger event, in this instance, is the network associated with the second user account identifying a login event whereby the first user accesses an account, via the network, for accessing media content. The trigger event, instigated by the network identifying a login event for media content access, initiates the process of associating the capabilities of the second user account to the first user's media content access level via the infotainment system 645. This system serves as the user device 620, providing a tailored interface reflecting the enhanced capabilities obtained from the association with the second user account, facilitated through modifications to the manifest files 630. The user device 620, as mentioned previously, may be a personal device of the user (e.g., a mobile device) which in this scenario may connect to the network associated with the second user account via the vehicle 640 or the vehicle infotainment system (e.g., an integrated Wi-Fi system of the vehicle).

In this example, the user device 620 may be provided by virtue of an in-built infotainment screen of the vehicle shown by 645. Additionally or alternatively, a portable user device, such as a tablet or smartphone, may be operationally coupled with an infotainment system of the vehicle 640, thereby defining user device 620. In some examples, the vehicle 640 may be a part of subscription plan, a rental car service or a taxi service offering such connectivity. The systems and processes described in previous examples are applicable to this scenario, facilitating the subsequent association of the capabilities of the second user account to the level of access to media content of the first user account via the user device 645 in the vehicle 640.

Similar scenarios may transpire in, for example, an aircraft 650 or a hospitality establishment 660, or any environment furnished with media consumption devices connected to a network associated with a second user.

In some examples, the user may transition between devices in different environments 640, 650 and 660 in a multi-step process. Initially, as the user interacts with a different device, the system employs various means such as login credentials, device identifiers, and/or network credentials to identify the user and the device in each environment.

In some examples, geolocation and geofencing may be used to trigger an association or disassociation between user accounts, e.g., an association or disassociation event. The system may utilise geolocation data to ascertain the user's location and determine if they are within a predefined geographical area or geofenced zone associated with the second user account. For instance, if a user accesses their account within a geofenced area of a specific hotel chain, the system may associate the capabilities of a second user account associated with that hotel chain to the user's account. This association may lead to enhanced media content access for the duration of the user's stay.

Disassociation between the capabilities of the second user account and the first user account may occur through various triggers, analogous yet opposite to the triggers for association.

One such trigger for disassociation may be a log-out event, where the first user logs out from their account on the user device. This log-out event may prompt the system to revert the capabilities of the first user account back to its original state prior to association.

Another trigger which may be used for disassociation may be a network disconnection. In instances where the user device is disconnected from the network associated with the second user account, the system may recognise this disconnection as a trigger for disassociation, and accordingly, the capabilities associated with the second user account are disengaged from the first user account.

Furthermore, the disassociation may be triggered upon completion of a predetermined period. The association between the user accounts may be configured to last for a fixed duration, post which the system automatically disassociates the enhanced capabilities from the first user account.

In some examples of the disclosure, the disassociation may be triggered upon the completion of a predetermined period (e.g., after 10 days). The association between user accounts may be configured to last for a fixed duration, after which the system automatically disassociates the enhanced capabilities from the first user account. For instance, during the login process, an OTT service might query a hotel's service database to determine the duration of the user's stay. If a first user account logs into a content streaming platform on the hotel's smart TV, the platform may manage the log-out process through various methods, such as associating an expiration date with the particular login ID or viewing session ID, or by providing explicit expiration directive by configuring a token that a device receives during the sign-in process. For example, the log-in endpoint for a media service (e.g., OTT service) can configure a token to expire after a certain number of hours or to expire on a specific date at a specific time, such as the time the user or hotel guest no longer have access to the room or hotel properties Similarly, the new upgraded capabilities of the account (e.g., access to live channels, ad-free content, premium content, etc.) can also be part of token that is used when the user device requests a content item from the playback service of the media service. For example, the token is now associated with a device ID, and any request from such device can used to determine entitlements of the device (e.g., can access 4K content but not 8K, etc.). Such token is also used by the playback service to serve the appropriate manifest files or generate new manifest files, if necessary. For example, the playback service may modify an existing manifest file to remove or add to it. The playback service may remove a rendition that allows that the client device to retrieve 8K content, and add a rendition that would allow the device's player to retrieved 4K content, for example. In some examples, the systems and methods provided herein allow for such a token to be transferred between user accounts, e.g., as a gift from one user to another, or as part of a promotion offered by a service provider.

In some embodiments, a device of the first user account may pair the device to the device of the second user account, for example, a mobile device paired with an infotainment system of a rental vehicle. An automatic log-out feature may address the potential issue of the device of the first user account not disassociating upon returning the vehicle. This prevents the next person who rents the car from accessing the previous user's profiles. In such scenarios, a force log-out command may be employed by the OTT service to ensure the application on the infotainment system logs out automatically at the end of the rental period. Similarly, when a user pairs their device (e.g., mobile device) with a new device that the mobile device has not paired with before (e.g., a rental car), then the mobile device might prompt the user to specific a duration before the pairing process needs to occur again should the mobile device need to reconnect to the car. This can allow the phone profile to be deleted from the list of devices that the car displays since the response the prompt may set an expiration for the profile that is related during the pairing or registration phase. For example, the user may be presented with a list of options such as "Permanent" in which case the profile exists until explicitly deleted by the user. Another option may be "Temporarily," in which case the profile will be deleted after a certain amount of time that can be supplied by the user or automatically received from the car rental agency. For example, the rental duration or session maybe shared or accessed by the car, in which case, the profile is removed when the duration or time has been reached.

The technical implementation of this feature may draw upon various mechanisms. For example, some services require users to re-login every 10 days. This may be facilitated by configuring the application to automatically log out at the end of a set period. By adopting a similar approach, OTT services may ensure that the first user account is logged out automatically at the end of an access period, whether it's determined by the length of a hotel stay, the duration of a car rental, or another similar criterion.

The system may also implement a manual disassociation trigger, where the first user or the second user, or an administrator could manually initiate the disassociation of the accounts through a user interface on the user device or via a remote interface.

Additionally or alternatively, disassociation may be triggered by geolocation. If the system is configured to associate the user accounts based on geolocation, moving out of the defined geographical boundary could trigger disassociation.

The mechanism of disassociation may be facilitated through the modification of manifest files, as previously discussed, reverting them back to the state prior to association. The control circuitry within the system facilitates the recognition of these disassociation triggers.

Figure 7A:
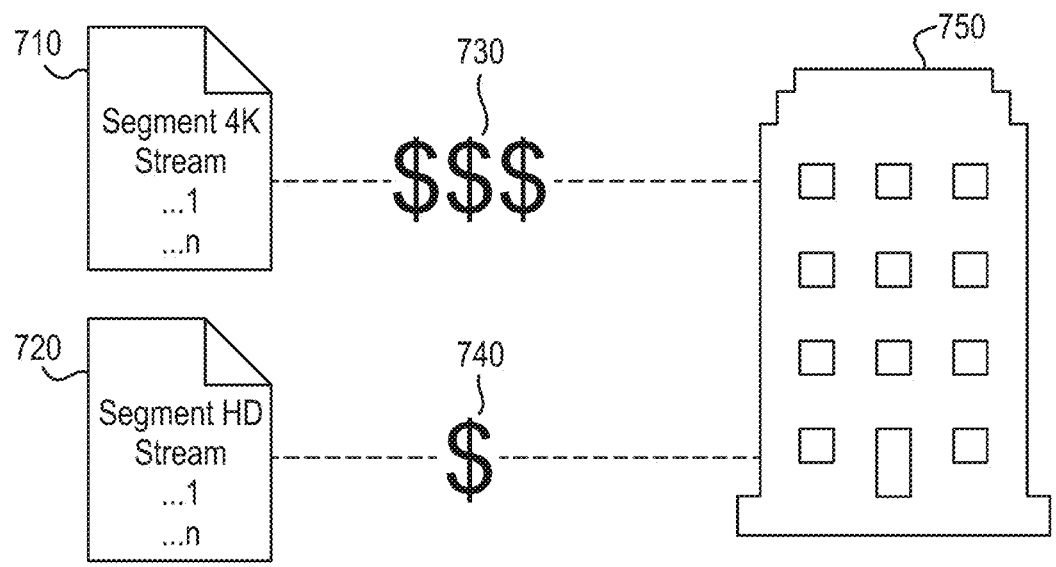
FIG. 7A illustrates an example of a hotel environment where different rooms are associated with varying levels of media content access.
Figure 7B:
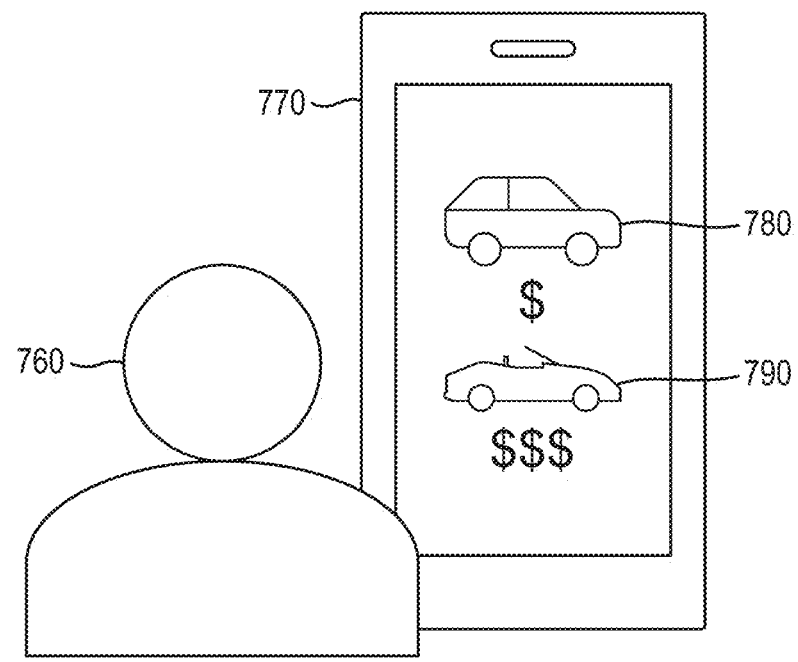
FIG. 7B illustrates an example of a transportation service interface where selecting a vehicle type determines the user's media content access level.

FIGS. 7A and 7B illustrates two different scenarios, highlighting how the associated capabilities may vary based on certain conditions, such as the level of service acquired by the first user. FIGS. 7A and 7B present a view of how the association of capabilities may be flexible and adaptive to different situations, offering a nuanced approach to enhance the user's experience based on their choices or the level of service they opt for.

In the example shown in FIG. 7A, a hospitality establishment 750 is depicted with multiple rooms. Among these rooms, two distinct types are highlighted-a more expensive room 730 shown with a manifest file 710, and a less expensive room 740 shown with a manifest file 720. The generation of these manifest files, 710 and 720, is influenced by the attributes of the user account, including features like ad-free content, 4K high resolution streaming, and simultaneous streaming on multiple devices. The playback service, having access to this account information may customise the manifest files accordingly. For instance, when a request for playback of a specific movie is made, a playback API service may provide a pre-existing manifest that supports 4K streaming if such content is available, or even generate a new manifest tailored to these specifications. This manifest includes references to content segments that the player can request and download for playback. The more expensive room 730 may offer an enhanced set of capabilities, such as 4K quality streaming, enriching the first user's access to media content and other services. Conversely, the less expensive room 740 might offer a basic set of capabilities. Depending on the room chosen by the first user, the playback API service may generate or select a manifest file that corresponds to the capability level associated with that room. If the user account, for instance, does not support 4K streaming but only HD, then the playback API service will deliver a manifest referencing HD and lower bitrate/resolution segments, such as standard definition.

The example shown in FIG. 7A demonstrates a potential relationship between the value of service acquired by the first user and the level of capabilities associated with their account. It displays a mechanism where the association of capabilities is dynamically adjusted based on the user's choices, thereby offering a tailored user experience. This mechanism may be executed through the manifest files 710 and 720.

The example shown in FIG. 7B displays a different scenario involving transportation options. Two types of vehicles are depicted, an expensive vehicle 790 and a less expensive vehicle 780. The first user 760, using a user device 770, possibly utilizing a taxi service application, is provided with options to choose a luxury ride or a standard ride. Besides the apparent difference in the type and quality of vehicles offered, the selection of a ride may also come with varied associated capabilities. When the first user opts for the more expensive vehicle 790, they may be notified of additional associated capabilities that come with this choice. These capabilities may not be limited to the infotainment system of the vehicle but extend to other features, such as a massage function in the seats or access to an in-built refrigerator. In some examples, the systems and methods disclosed herein may be implemented as part of a vehicle subscription model, whereby users subscribe to different levels of access to capabilities of a vehicle, or capabilities across a range of vehicles.

The association of capabilities as discussed in previous examples revolve around digital or media-related enhancements, like higher resolution streaming on infotainment systems. However, the scope of associating capabilities may extend beyond the digital domain. For the avoidance of doubt, such an extension of capabilities to capabilities outside of the operation of user device are applicable to all of the example disclosed herein, where technically possible. Vehicles, hospitality establishments, or other scenarios may house a variety of amenities and features, both digital and physical, that may be regulated based on the association of capabilities. The mentioned massage function in the seats or access to an in-built refrigerator are physical examples of such capabilities.

In some examples, the association mechanism may regulate a number of features. For instance, in a hospitality scenario, room temperature, lighting, or access to exclusive facilities could be managed based on the associated capabilities. In a vehicular scenario, apart from the infotainment system, features like seat heating, ambient lighting, surround sound or autonomous driving features may be part of the associated capabilities.

The association of these capabilities may be communicated to the user through a service application and facilitated through a backend system which may dynamically associate the capabilities based on the user's selection. The backend system may also have a mechanism to disassociate these capabilities once the ride is over or if the user decides to change to a less expensive vehicle.

In some examples, a system may be designed to handle changes in user choices or levels of service dynamically. For instance, if a user decides to upgrade their room in the hospitality scenario or opt for a luxury ride in the vehicle scenario, the system may adapt to these changes by reading the updated features or corresponding manifest file and associating the new set of capabilities with the user account.

Figure 8A:
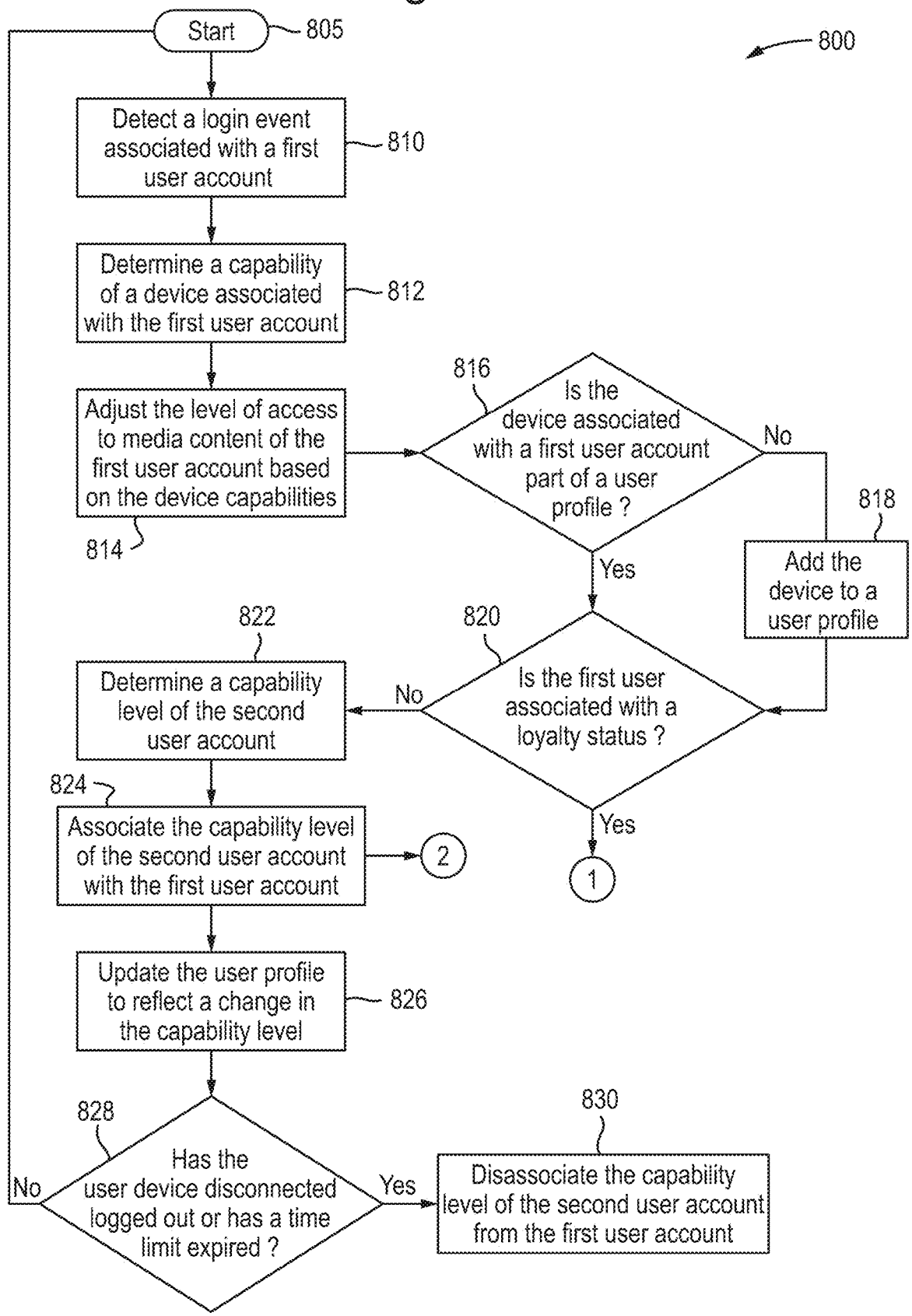
FIG. 8A presents a flowchart of a process for associating the capability level of a second user account with the level of access to media content of a first user account, in accordance with some examples of the disclosure.
Figure 8B:
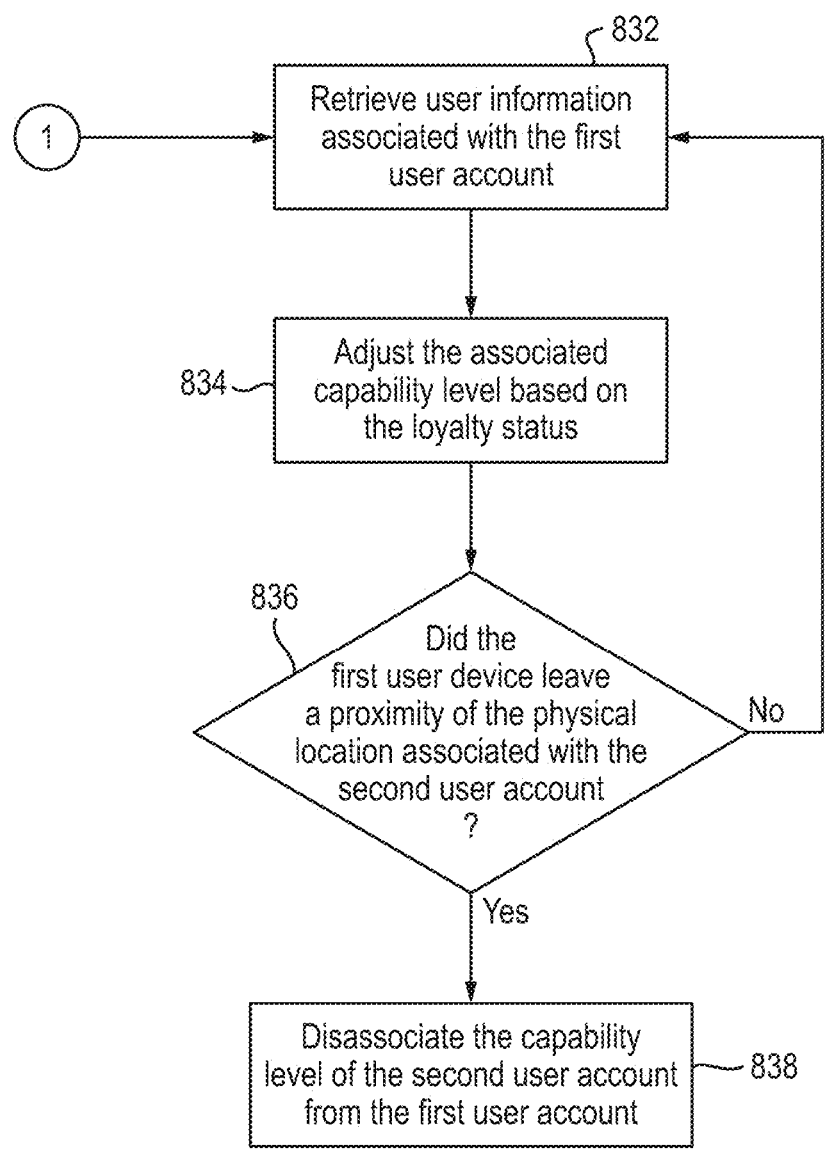
FIG. 8B presents a flowchart of a process where a user's activity status influences the degree of media content access.
Figure 8C:
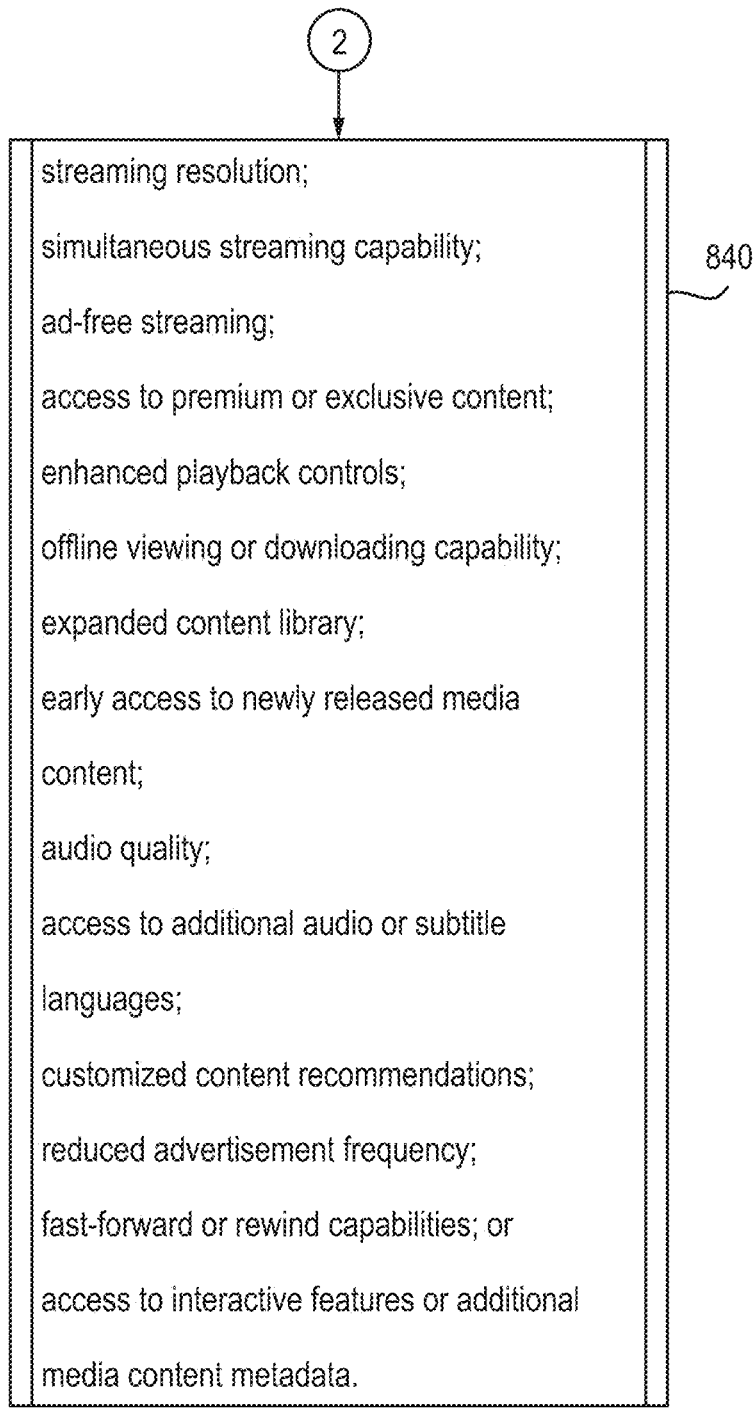
FIG. 8C presents a flowchart displaying a list of potential media content access capabilities.

The schematic representations of FIGS. 8A, 8B, and 8C serve to illustrate an exemplary process flow for associating and managing user account capabilities, particularly as they relate to media content access. These figures are to be understood as functioning compatibly with any other aspect of the present disclosure, and the actions depicted therein can be performed in any suitable alternative sequence or concurrently, as necessitated by the specific requirements of the disclosure.

FIG. 8A illustrates process 800, initiated with the detection of a user's login event at step 810. As mentioned previously, other trigger events may be used to detect a connection between a user device and a network associated with the second user. This detection triggers a series of technical actions within control circuitry, e.g., the control circuitry of a server associated with the first user account, starting with the determination of the device's capabilities at step 812. This ensures the subsequent adjustments to the user's media content access levels, performed at step 814, are compatible with the device's technical specifications.

The process determines that enhancements to the user experience are both feasible and optimized for the device in question. For instance, if the user logs in using a smart television, the detection at step 810 triggers the server's control circuitry to assess the television's resolution capabilities, audio output options, and any platform-specific features at step 812. The control circuitry may then adjust the streaming quality options, enables surround sound, and integrates platform-exclusive interactive media features, aligning with the television's advanced features at step 814.

At step 816 a check is carried out to determine if the device is already part of a user profile. A user profile may serve as a digital repository of user-specific data, preferences, and historical interaction records. It may be stored on servers, e.g., a server associated with the second user account, which may be located, as an example, on-premises of the service provider, e.g., a hospitality establishment, or hosted in the cloud. The user profile may be configured to store a comprehensive view of the user's engagement both past and present with the service, including device types, content preferences, usage patterns, and payment history.

In some examples, a user profile may store a device's technical capabilities, such as screen resolution, sound output quality, processing power, and software versions which are catalogued to tailor the content delivery to the device's specific features. Moreover, the profile may include the user's interaction with media content i.e., what they watch, when they watch it, and how they engage with it.

When the system at step 816 identifies a device as part of the user profile, it indicates that the device has been previously authenticated, and its capabilities are known. This familiarity allows the system to bypass certain preliminary checks and directly apply the appropriate levels of access to media content, streamlining the user's experience.

If it is not recognized, step 818 incorporates the device into a user profile which is associated to the first user. This action ensures that each device used by the user is recognized and tracked by the system.

At step 820, the system queries an activity status of a user account relative to the second user account, e.g., whether the user has a loyalty status with a particular hospitality service. If affirmative, the flow transitions to FIG. 8B, which focuses on tailoring the user's capability level based on this status. If there is no loyalty status, the process advances to step 822, where the system determines the capability level of a second user account. At step 824, these capabilities are then associated with the first user account, enriching the user's media access privileges. The associated capabilities are provided in more detail in FIG. 8C, which lists specific examples of capabilities that can be associated with the user account at step 840. These capabilities are not just limited to streaming quality but extend to various content interaction enhancements.

In some examples, a primary profile, such as a master user account may be configured to access the features of the second account (e.g., increased streaming resolution or ad-free viewing). The master account may be configured to access specific features, such as allowing more devices to stream simultaneously. Furthermore, the master user account may configure other accounts to access only some features of the second user account, such as allowing other accounts to watch ad-free content or enjoy enhanced playback controls. In this context, the master account may be used to configure other accounts and adjust the capabilities associated with the first user account, establishing a system where the second user account provides the capabilities while the master account offers a degree of configurability and personalized management of these capabilities.

In FIG. 8B, user information is retrieved at step 832 deriving from the aforementioned loyalty status of the first user. At step 834, the system adjusts the associated capability level based on the loyalty status. This ensures that loyal users or users who are part of a loyalty scheme receive benefits commensurate with their status, such as improved access or exclusive content, thereby encouraging continued engagement with the service.

The loyalty status as referenced in step 832 of FIG. 8B, is an attribute that reflects the engagement and relationship history between the user and the service provider. Unlike a user profile, the loyalty status is a measure of the user's ongoing interaction and commitment to the service, often accumulated through a rewards program.

Loyalty status may manifest in various forms beyond traditional tiered systems. For example, it could be based on points earned through frequent interactions, where points could be redeemed for specific capabilities such as exclusive content access or custom user interface themes. Alternatively, it could be based on the longevity of the subscription, where long-term subscribers receive periodic upgrades to their service level, such as increased download limits or the ability to share access with family members.

Another example might include a partnership status, where users associated with corporate partners or affiliates of the service provider receive benefits like waived fees for premium features or cross-service integrations that provide a seamless experience across different platforms.

The process also includes monitoring for geographic proximity to the service provider's location at step 836. If the user device exits the predetermined proximity, step 838 initiates the disassociation of the special capabilities associated with the second user account, effectively reverting the first user account to its standard capability level.

The utilization of geographic proximity, as depicted in step 836 of FIG. 8b, serves as a method for contextually adapting the capabilities and services offered to a user based on their physical location relative to a predetermined area, often associated with the service provider's facilities.

Geographic proximity may be beneficial in several ways. For hospitality services, such as hotels or resorts, it allows for the customization of user access to media content and other amenities based on their presence within the establishment. This may enable guests to unlock premium content or additional services, such as access to exclusive areas or events, when they are detected within the premises. It reinforces the exclusivity and value of on-site offerings and enhances the customer experience.

The implementation of geographic proximity detection may rely on technologies such as GPS, Wi-Fi triangulation, or RFID (radio-frequency identification). For instance, a user's smartphone app could communicate with the hotel's network to verify their location through Wi-Fi signal strength or connect to beacons placed around the property.

Alternatives to geographic proximity might include the use of QR codes or NFC (near field communication) tags. A user could scan a QR code in their room to access room-specific content or tap an NFC tag at an event to gain entry or unlock special features on their device.

Another alternative could be the implementation of a virtual perimeter or geofencing, where a virtual geographic boundary is established, and when a user's device crosses this boundary, certain features or services are automatically enabled or disabled. This method may be useful for mobile applications where the user's location changes frequently.

Moreover, using geographic proximity can serve as a security measure, ensuring that only users within a certain area can access specific capabilities, thus preventing unauthorized access from remote locations.

Following the association of capabilities with the user account at step 824 of FIG. 8A, the process continues at step 826, where the system updates the user profile to reflect the new capability level. This step ensures that any changes to the user's access rights, or available services are accurately recorded in the system. The updated profile ensures consistent application of the associated capabilities across all user interactions and prevents discrepancies between the user's expectations and the actual services received.

At step 828, the system actively monitors the status of the user's device in relation to the network. This includes but is not limited to, checking whether the device has been disconnected, whether the user has logged out, or if a predetermined time limit has expired. Should any of the conditions in step 828 be met, the process moves to step 830 where the system disassociates the capability level of the second user account from the first user account.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Only the claims that follow are meant to set bounds as to what a claimed invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
    detecting, using control circuitry, a login event associated with a first account on a network associated with a second account, the first account providing a level of access to media content based at least in part on an advertising-supported video on demand (AVOD) model;
    determining, using the control circuitry, a capability level of the second account, the capability level defining how media content is delivered over the network based at least in part on a subscription video on demand (SVOD) model with a lower frequency of advertisements than the AVOD model;
    associating, using the control circuitry, the capability level of the second account with the level of access to media content of the first account; and
    based at least in part on the associating, causing presentation of a media content item based at least in part on the SVOD model.

2. The method of claim 1 further comprising:
    disassociating the capability level of the second account from the first account upon satisfaction of a predetermined condition, wherein the predetermined condition comprises one or more of:
    disconnection of a user device associated with the first account from the network;
    expiration of a predefined period; or
    receipt of a logout instruction in relation to the first account.

3. The method of claim 1 further comprising:
    based at least in part on detecting a login event associated with the first account on the network associated with the second account, determining a capability of a device associated with the first account to utilize the capability level associated with the second account; and
    adjusting the level of access to media content of the first account based at least in part on the capability of the device.

4. The method of claim 1 further comprising:
    identifying a network connection of a device associated with the first account to the network associated with the second account;
    adding the device to a user profile indicating devices associated with the first account; and
    updating the user profile to reflect a change in the capability level during the association of the capability level of the second account to the first account.

5. The method of claim 1, wherein the capability level further comprises one or more of:
    a streaming resolution;
    a simultaneous streaming capability;
    access to premium or exclusive content;
    enhanced playback controls;
    an offline viewing or downloading capability;
    an expanded content library;
    early access to newly released media content;
    an audio quality;
    access to additional audio or subtitle languages;
    customized content recommendations;
    reduced advertisement frequency;
    fast-forward or rewind capabilities; or
    access to interactive features or additional media content metadata.

6. The method of claim 1, wherein the second account is associated with a service provider and the network is associated with a physical location of the service provider.

7. The method of claim 6, further comprising:
    disassociating the capability level of a device associated with the first account from the level of access to media content of the first account when the device leaves a proximity of the physical location associated with the service provider.

8. The method of claim 6, further comprising:
retrieving user information associated with the first account;
identifying an activity status associated with the user information in relation to the service provider associated with the second account; and
adjusting the associated capability level based at least in part on the activity status.

9. The method of claim 1, further comprising:
based at least in part on the associating, updating a manifest file associated with the media content item, wherein the media content item is presented based at least in part on the updated manifest file.

10. The method of claim 9, wherein updating the manifest file comprises:
identifying one or more references to one or more advertisement segments in the manifest file; and
causing each of the one or more references to the one or more advertisement segments to be removed from the manifest file.

11. The method of claim 1, wherein the SVOD model is an advertisement-free model, and wherein no advertisements are presented during the presentation of the media content item.

12. The method of claim 1, wherein a first manifest file comprising one or more references to one or more advertisement segments is associated with the AVOD model, and wherein a second manifest file that does not comprises references to advertisement segments is associated with the SVOD model, and wherein causing presentation of the media content item based at least in part on the SVOD model is based at least in part on using the second manifest file.

13. The method of claim 1, further comprising:
causing simultaneous display of first data indicating capabilities of the first account and second data indicating capabilities of the second account, wherein at least one of the displayed capabilities indicated by the second data is not included in the displayed capabilities indicated by the first data.

14. A system comprising:
control circuitry configured to:
detect a login event associated with a first account on a network associated with a second account, the first account providing a level of access to media content based at least in part on an advertising-supported video on demand (AVOD) model;
determine a capability level of the second account, the capability level defining how media content is delivered over the network based at least in part on a subscription video on demand (SVOD) model with a lower frequency of advertisements than the AVOD model;
associate the capability level of the second account with the level of access to media content of the first account; and
based at least in part on the associating, cause presentation of a media content item based at least in part on the SVOD model.

15. The system of claim 14, wherein the control circuitry is configured to:
disassociate the capability level of the second account from the first account upon satisfaction of a predetermined condition, wherein the predetermined condition comprises one or more of:
disconnection of a user device associated with the first account from the network;
expiration of a predefined period; or
receipt of a logout instruction in relation to the first account.

16. The system of claim 14, wherein the control circuitry is configured to:
based at least in part on detecting a login event associated with the first account on the network associated with the second account, determine a capability of a device associated with the first account to utilize the capability level associated with the second account; and
adjust the level of access to media content of the first account based at least in part on the capability of the device.

17. The system of claim 14, wherein the control circuitry is configured to:
identify a network connection of a device associated with the first account to the network associated with the second account;
add the device to a user profile indicating devices associated with the first user account; and
update the user profile to reflect a change in the capability level during the association of the capability level of the second account to the first account.

18. The system of claim 14, wherein the capability level further comprises one or more of:
a streaming resolution;
a simultaneous streaming capability;
access to premium or exclusive content;
enhanced playback controls;
an offline viewing or downloading capability;
an expanded content library;
early access to newly released media content;
an audio quality;
access to additional audio or subtitle languages;
customized content recommendations;
reduced advertisement frequency;
fast-forward or rewind capabilities; or
access to interactive features or additional media content metadata.

* * * * *